United States Patent
Maruo et al.

(10) Patent No.: US 9,845,386 B2
(45) Date of Patent: Dec. 19, 2017

(54) MULTILAYER HEAT-SHRINKABLE STYRENE-BASED FILM AND METHOD FOR PRODUCING THE SAME

(75) Inventors: Masaharu Maruo, Moriyama (JP); Naoki Ohno, Moriyama (JP); Tadayoshi Tanaka, Moriyama (JP); Hiroyuki Furukawa, Moriyama (JP)

(73) Assignee: GUNZE LIMITED, Ayabe-shi (JP)

( * ) Notice: Subject to any disclaimer, the term of this patent is extended or adjusted under 35 U.S.C. 154(b) by 806 days.

(21) Appl. No.: 12/375,185

(22) PCT Filed: Jul. 20, 2007

(86) PCT No.: PCT/JP2007/064347
§ 371 (c)(1),
(2), (4) Date: Jan. 26, 2009

(87) PCT Pub. No.: WO2008/013113
PCT Pub. Date: Jan. 31, 2008

(65) Prior Publication Data
US 2009/0311503 A1    Dec. 17, 2009

(30) Foreign Application Priority Data

Jul. 26, 2006  (JP) ................................. 2006-203660
Jul. 26, 2006  (JP) ................................. 2006-203677

(51) Int. Cl.
*B32B 5/16*    (2006.01)
*B32B 5/00*    (2006.01)
(Continued)

(52) U.S. Cl.
CPC .............. *C08L 51/04* (2013.01); *B32B 25/14* (2013.01); *B32B 27/08* (2013.01); *B32B 27/18* (2013.01);
(Continued)

(58) Field of Classification Search
USPC ................... 428/36.9, 220, 323; 264/177.17
See application file for complete search history.

(56) References Cited

U.S. PATENT DOCUMENTS 4,914,248 A * 4/1990 Kitagawa et al. ............ 525/113

FOREIGN PATENT DOCUMENTS

EP         1084815 A1     3/2001
JP       09-272182 A     10/1997
(Continued)

OTHER PUBLICATIONS

Machine English Translation of JP_2007/030412_A; Yukio Yamaura, Heat-Shrinkable Multilayer Film, Feb. 7, 2007; JPO, whole document.*

(Continued)

*Primary Examiner* — Tahseen N Khan
(74) *Attorney, Agent, or Firm* — Westerman, Hattori, Daniels & Adrian, LLP

(57) ABSTRACT

The present invention provides the following multilayer heat-shrinkable styrene-based film having an appropriate surface shape, together with excellent lubricity and blocking resistance, and resistance to ink skipping and like problems during the printing process:

a multilayer heat-shrinkable styrene-based film having:
layers (A) each containing 0.8 to 2.5 parts by weight of high impact polystyrene resin and 0.02 to 0.15 parts by weight of organic fine particles having a mean particle diameter of 0.5 to 5 μm per 100 parts by weight of a block copolymer of 75 to 90 wt % vinyl aromatic hydrocarbon and 10 to 25 wt % conjugated diene hydrocarbon; and
a layer (B1) containing a block copolymer of 70 to 85 wt % vinyl aromatic hydrocarbon and 15 to 30 wt % conjugated diene hydrocarbon; or (Continued)

a layer (B2) containing a resin composition containing a copolymer of 98 to 40 wt % vinyl aromatic hydrocarbon and 2 to 60 wt % aliphatic unsaturated carboxylic acid ester.

9 Claims, 2 Drawing Sheets

(51) Int. Cl.
|  |  |  |
|---|---|---|
| B29C 47/14 | (2006.01) |  |
| C08L 51/04 | (2006.01) |  |
| B32B 25/14 | (2006.01) |  |
| B32B 27/18 | (2006.01) |  |
| B32B 27/28 | (2006.01) |  |
| C08F 279/02 | (2006.01) |  |
| C08L 53/02 | (2006.01) |  |
| B32B 27/08 | (2006.01) |  |
| B32B 27/30 | (2006.01) |  |

(52) U.S. Cl.
CPC ............ *B32B 27/28* (2013.01); *B32B 27/302* (2013.01); *B32B 27/308* (2013.01); *C08F 279/02* (2013.01); *C08L 53/02* (2013.01); B32B 2307/558 (2013.01); B32B 2307/736 (2013.01); B32B 2439/00 (2013.01); B32B 2519/00 (2013.01); Y10T 428/25 (2015.01); Y10T 428/254 (2015.01)

(56) References Cited

FOREIGN PATENT DOCUMENTS

| JP | 09272182 | A | * | 10/1997 |
|---|---|---|---|---|
| JP | 2000-066603 | A |  | 3/2000 |
| JP | 2000-094598 | A |  | 4/2000 |
| JP | 2000-185373 | A |  | 7/2000 |
| JP | 2000185373 | A | * | 7/2000 |
| JP | 2000-211072 | A |  | 8/2000 |
| JP | 2001-347625 | A |  | 12/2001 |
| JP | 2002-046231 | A |  | 2/2002 |
| JP | 2002046231 | A | * | 2/2002 |
| JP | 2002-161147 | A |  | 6/2002 |
| JP | 2002161147 | A | * | 6/2002 |
| JP | 2003-145667 | A |  | 5/2003 |
| JP | 2003128861 | A | * | 5/2003 |
| JP | 2003-261727 | A |  | 9/2003 |
| JP | 2004-074687 | A |  | 3/2004 |
| JP | 2007030412 | A | * | 2/2007 |

OTHER PUBLICATIONS

Machine English Translation of JP_2000/185373_A; Satani, Shoichi, Multilayered Polystyrenic Heat-Shrinkable Film, Jul. 4, 2000; JPO, whole document.*
Machine English Translation of JP_09272182_A; Okuda, Tomohisa, Heat-Shrinkable Multi-Layered Film, Oct. 21, 1997; JPO, whole document.*
Machine English Translation of JP_2002161147_A; Yamada, Hirofumi, Shrinkable Film, Jun. 4, 2002; JPO, whole document.*
Machine English Translation of JP_2002046231_A; Okuda, Tomohisa, Heat-Shrinkable Multi-Layered Film, Feb. 12, 2002; JPO, whole document.*
Derwent Abstract and Machine_English_Translation_JP_2000185373_A1; Satani; Multilayered Polystyrenic Heat-Shrinkable Film; Jul. 4, 2000; JPO and Derwent; whole document.*
Derwent Abstract and Machine_English_Translation_JP_2002046231_A1; Okuda; Multilayered Heat-Shrinkable Polystyrenic Film; Feb. 12, 2002; JPO and Derwent; whole document.*
Derwent Abstract and Machine_English_Translation_JP_2002161147_A1; Yamada; Shrinkable Film; Jun. 4, 2002; JPO and Derwent; whole document.*
Derwent Abstract and Machine_English_Translation_JP_2003128861_A1; Hoshi; Polymer Composition and Heat Shrinkable Film Therefrom; May 8, 2003; JPO and Derwent; whole document.*
International Search Report of PCT/JP2007/064347, dated Oct. 23, 2007.
Supplementary European Search Report dated Feb. 9, 2012, issued in corresponding European Patent Application No. 07791084.2.

* cited by examiner

MULTILAYER HEAT-SHRINKABLE STYRENE-BASED FILM AND METHOD FOR PRODUCING THE SAME

TECHNICAL FIELD

The present invention relates to a multilayer heat-shrinkable styrene-based film which can be used for shrink packaging, shrink labeling, etc., has excellent lubricity and blocking resistance, and resists ink skipping and like problems during the printing process; and a method for producing the same.

BACKGROUND ART

In recent years, with the spread of PET bottle drinks, beverage manufacturers have been selling a large variety of products. Such PET bottle products are decorated with design-focused labels for the purpose of clearly differentiating them from other brands, improving their image to customers, etc.

As PET bottle labels, those having a substrate of a polyester-based shrink film, polystyrene-based shrink film, or polyolefin-based shrink film are known. Among these, polystyrene-based shrink films are generally used for their ease of cutting along a perforated line, shrinking quality, etc.

A number of suggestions has been made regarding such polystyrene-based shrink films. For example, to provide a shrink film having excellent low-temperature shrinkability, natural shrinkability (shrinkability under ordinary temperature), etc., a three-layer heat-shrinkable laminate film having outer layers and an intermediate layer of a styrene-butadiene block copolymer has been suggested (see, e.g., Patent document 1). Further, for the purpose of improving blocking resistance, natural shrinkage resistance (resistance to shrinkage under ordinary temperature), and the like under long-term storage, shrink films containing, as essential ingredients, rubber modified styrene, a lubricant, and inorganic or organic fine particles have been suggested. (See, e.g., Patent document 2.) However, no film has yet been obtained that could solve the problem of ink skipping during the printing process, in addition to having a smooth film surface and blocking resistance.

Patent document 1: Japanese Unexamined Patent Publication No. 2004-74687
Patent document 2: Japanese Unexamined Patent Publication No. 2002-161147

DISCLOSURE OF THE INVENTION

Problems to be Solved by the Invention

The main object of the present invention is to provide a multilayer heat-shrinkable styrene-based film having an appropriate surface shape, together with excellent lubricity and blocking resistance, and resistance to ink skipping and like problems during the printing process.

Means for Solving the Problems

The present inventors conducted extensive research, and as a result found that when the front layer and the back layer of a multilayer heat-shrinkable film are formed of a resin obtained by mixing organic fine particles having a predetermined particle diameter and high impact polystyrene into a block copolymer of a vinyl aromatic hydrocarbon and a conjugated diene hydrocarbon, and a core layer thereof is formed of a block copolymer of a vinyl aromatic hydrocarbon and a conjugated diene hydrocarbon at a ratio that is different from the above block copolymer, or a copolymer of a vinyl aromatic hydrocarbon and an aliphatic unsaturated carboxylic acid ester, the transparency, lubricity, and blocking resistance of the film are improved, and ink skipping during the printing process is suppressed. The present invention was accomplished as a result of further research based on these findings.

The present invention provides the following multilayer heat-shrinkable styrene-based films.

1. A multilayer heat-shrinkable styrene-based film comprising a layer (B1) or a layer (B2) between two layers (A),
each of the layers (A) comprising 0.8 to 2.5 parts by weight of high impact polystyrene resin and 0.02 to 0.15 parts by weight of organic fine particles having a mean particle diameter of 0.5 to 5 μm per 100 parts by weight of a block copolymer of 75 to 90 wt % vinyl aromatic hydrocarbon and 10 to 25 wt % conjugated diene hydrocarbon,
the layer (B1) comprising a block copolymer of 70 to 85 wt % vinyl aromatic hydrocarbon and 15 to 30 wt % conjugated diene hydrocarbon, and
the layer (B2) comprising a resin composition containing a copolymer of 98 to 40 wt % vinyl aromatic hydrocarbon and 2 to 60 wt % aliphatic unsaturated carboxylic acid ester.
2. A multilayer heat-shrinkable styrene-based film according to item 1, wherein, in each of the layers (A), the block copolymer of a vinyl aromatic hydrocarbon and a conjugated diene hydrocarbon is a styrene-butadiene block copolymer (85 wt % styrene and 15 wt % butadiene); the high impact polystyrene is a styrene-butadiene graft polymer; and the organic fine particles are particles of cross-linked methyl methacrylate-styrene copolymer.
3. A multilayer heat-shrinkable styrene-based film according to item 1 or 2, wherein, in the layer (B1), the block copolymer of a vinyl aromatic hydrocarbon and a conjugated diene hydrocarbon is a block copolymer of styrene and 1,3-butadiene.
4. A multilayer heat-shrinkable styrene-based film according to any of items 1 to 3, wherein, in the layer (B2), the copolymer of a vinyl aromatic hydrocarbon and an aliphatic unsaturated carboxylic acid ester is a copolymer of styrene and butyl acrylate.
5. A multilayer heat-shrinkable styrene-based film according to any one of items 1 to 4, wherein the layer (B2) further comprises a block copolymer of styrene and 1,3-butadiene.
6. A multilayer heat-shrinkable styrene-based film according to any one of items 1 to 5, wherein the total thickness of the multilayer heat-shrinkable styrene-based film is 30 to 70 μm, the thickness of each of the layers (A) is 2.5 to 17.5 μm, and the thickness of the layer (B) is 25 to 58.3 μm.
7. A multilayer heat-shrinkable styrene-based film according to any one of items 1 to 6, having a three-layer structure of layer (A)/layer (B1)/layer (A) or layer (A)/layer (B2)/layer (A).
8. A multilayer heat-shrinkable styrene-based film according to item 7, further comprising a layer (C) as an intermediate layer between the layer (B) and one or each of the layers (A); the layer (C) being at least one element selected from the group consisting of styrene homopolymers (GPPS), styrene-conjugated diene block copolymer hydrogenation products (SEBS, SIBS, etc.), a mixture of resins that form the layers (A) and the layer (B1), and a mixture of resins that form the layers (A) and the layer (B2).
9. A multilayer heat-shrinkable styrene-based film according to item 9, having a five-layer structure of layer (A)/layer (C)/layer (B1)/layer (C)/layer (A) or layer (A)/layer (C)/ layer (B2)/layer (C)/layer (A).

10. A method for producing a multilayer heat-shrinkable styrene-based film, the method comprising the steps of extruding and stretching:

a resin composition (a) comprising 0.8 to 2.5 parts by weight of high impact polystyrene resin and 0.02 to 0.15 parts by weight of organic fine particles having a mean particle diameter of 0.5 to 5 μm per 100 parts by weight of a block copolymer of 75 to 90 wt % vinyl aromatic hydrocarbon and 10 to 25 wt % conjugated diene hydrocarbon; and a resin composition (b1) comprising a block copolymer of 70 to 85 wt % vinyl aromatic hydrocarbon and 15 to 30 wt % conjugated diene hydrocarbon; or a resin composition (b2) comprising a copolymer of 98 to 40 wt % vinyl aromatic hydrocarbon and 2 to 60 wt % aliphatic unsaturated carboxylic acid ester, so that the resin composition (a) forms a front layer and a back layer, and the resin composition (b1) or (b2) forms a core layer.

Effects of the Invention

According to the present invention, a layer (A), which serves as the front surface (and the rear surface) of the film, is formed of a copolymer of a vinyl aromatic hydrocarbon and a conjugated diene hydrocarbon, the copolymer containing a predetermined amount of organic fine particles having a predetermined particle diameter and a predetermined amount of high impact polystyrene. This makes it possible to provide excellent lubricity and blocking resistance to a multilayer heat-shrinkable styrene-based film without impairing the transparency. When a block copolymer of a vinyl aromatic hydrocarbon and a conjugated diene hydrocarbon is used to form the core layer (layer B1), a film having excellent low-temperature shrinkability and excellent shock resistance can be obtained. A copolymer of a vinyl aromatic hydrocarbon and an aliphatic unsaturated carboxylic acid ester (layer B2) has resistance to natural shrinkage and is a relatively hard resin, and the maintenance of the film shape is thus easy. Further, the film of the present invention resists ink skipping and like problems during the printing process.

BEST MODE FOR CARRYING OUT THE INVENTION

Multilayer Heat-Shrinkable Styrene-Based Film

Figure 1:
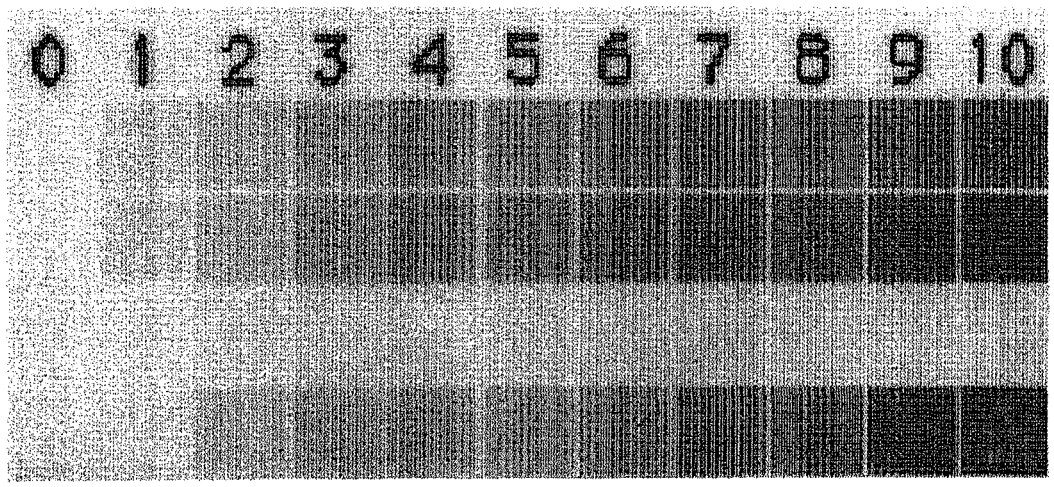
FIG. 1 is a photograph showing the results of an evaluation of ink skipping in Example 1.

The multilayer heat-shrinkable styrene-based film of the present invention has at least three layers including layers (A) and a layer (B). More specifically, the multilayer heat-shrinkable styrene-based film of the present invention has a layer (B) between two layers (A). The following explains each of the layers that form the multilayer heat-shrinkable styrene-based film of the present invention.

(1) Layers (A)

Layers (A), i.e., a front layer and a back layer, are both formed of a resin composition obtained by mixing organic fine particles and an high impact polystyrene resin into a block copolymer of a vinyl aromatic hydrocarbon and a conjugated diene hydrocarbon. The compositions of the layers (A) are explained hereinafter.

(i) Block Copolymer of a Vinyl Aromatic Hydrocarbon and a Conjugated Diene Hydrocarbon Examples of vinyl aromatic hydrocarbons usable in the present invention include styrene, o-methylstyrene, p-methylstyrene, 2,4-dimethylstyrene, 2,5-dimethylstyrene, α-methylstyrene, etc. Styrene is preferable.

Examples of usable conjugated diene hydrocarbons include 1,3-butadiene, 2-methyl-1,3-butadiene (isoprene), 2,3-dimethyl-1,3-butadiene, 1,3-pentadiene, 1,3-hexadiene, etc. 1,3-Butadiene and isoprene are preferable.

Among block copolymers of such a vinyl aromatic hydrocarbon and such a conjugated diene hydrocarbon, a preferable combination is, for example, the combination of styrene and 1,3-butadiene.

A block copolymer of a vinyl aromatic hydrocarbon and a conjugated diene hydrocarbon as described above may be used alone. Alternatively, a combination of two or more kinds of block copolymers of a vinyl aromatic hydrocarbon and a conjugated diene hydrocarbon having different compositions may also be used. More specifically, a combination of two or more kinds of block copolymers having different proportions of vinyl aromatic hydrocarbon and conjugated diene hydrocarbon may be used, and two or more kinds of block copolymers having different combinations of vinyl aromatic hydrocarbon and conjugated diene hydrocarbon may also be used.

The content of vinyl aromatic hydrocarbon in such a block copolymer is about 75 to about 90 wt %, preferably about 80 to about 90 wt %, and more preferably about 80 to about 85 wt %.

In the block copolymer, the content of conjugated diene hydrocarbon is about 10 to about 25 wt %, preferably about 10 to about 20 wt %, and more preferably about 15 to about 20 wt %. A vinyl aromatic hydrocarbon content of 75 wt % or more reduces the likelihood of blocking during heating of the film, and a content of 90 wt % or less does not lower the thermal shrinkage. A content within such a range is thus desirable.

The MFR of the block copolymer (temperature: 200° C., load: 49.03 N) is 2 to 15 g/10 min, and preferably 4 to 9 g/10 min.

(ii) High Impact Polystyrene

The high impact polystyrene used in the present invention may be, for example, styrene-butadiene rubber obtained by graft polymerization of styrene and butadiene (styrene-butadiene graft polymer); or a resin obtained by dissolving polybutadiene rubber in a styrene monomer followed by bulk polymerization, solution polymerization, suspension polymerization, or simple mechanical mixing of the obtained solution. Toyo Styrol E640 (product of Toyo-Styrene Co., Ltd.), PSJ-polystyrene H6872 (product of PS Japan Corporation), and like commercially available products may also be used.

High impact polystyrene generally has a two-phase structure of a polystyrene phase and a rubber phase, a so-called sea-island structure, in which a rubber phase is dispersed in a polystyrene phase.

The particle diameter of the rubber phase dispersed in the polystyrene phase is preferably about 1 to about 3 μm, and more preferably about 2 to about 2.5 μm. When the particle diameter of the rubber phase is more than 1 μm, the film surface is improved, thereby reducing the likelihood of blocking and like problems. When the particle diameter of the rubber phase is 3 µm or less, defects due to ink skipping during the printing process are less likely to occur.

The MFR of the high impact polystyrene used in the present invention (temperature: 200° C., load: 49.03 N) is preferably about 1.5 to about 10 g/10 min, and more preferably about 2 to about 8 g/10 min.

According to the present invention, the content of high impact polystyrene is about 0.8 to about 2.5 parts by weight, preferably about 1 to about 2 parts by weight, and more preferably about 1 to about 1.8 parts by weight, per 100 parts by weight of a block copolymer of a vinyl aromatic hydrocarbon and a conjugated diene hydrocarbon. An high impact polystyrene content of 0.8 parts by weight or more reduces the likelihood of blocking between film surfaces, and a content of 2.5 parts by weight or less does not lower the transparency of the film. A content within such a range is thus desirable.

(iii) Organic Fine Particles

Examples of usable organic fine particles include polymethylmethacrylate, polystyrene, methyl methacrylate-styrene copolymers, etc. Methyl methacrylate-styrene copolymers are preferable. These organic fine particles may consist of a single kind, and may also be used in a combination of two or more kinds. In the present invention, organic fine particles may be either a cross-linked product or a non-cross-linked product. Commercially available organic fine particles may also be used in the present invention. Examples thereof include Ganzpearl manufactured by Ganz Chemical Co. Ltd., ART PEARL manufactured by Negami Chemical Industrial Co., Ltd., and the like.

The mean diameter of the organic fine particles used in the present invention is about 0.5 to about 5 µm, and preferably about 1 to about 4 µm. A mean particle diameter of 0.5 µm or more provides excellent effects to improve the lubricity and blocking resistance, and a mean particle diameter of 5 µm or less reduces the likelihood of ink skipping and the like during the printing process. A mean particle diameter within such a range is thus desirable. In the present invention, a combination of organic fine particles having different diameters may be used.

The content of organic fine particles is about 0.02 to about 0.15 parts by weight, preferably about 0.04 to about 0.12 parts by weight, and more preferably about 0.05 to about 0.12 parts by weight, per 100 parts by weight of the block copolymer of a vinyl aromatic hydrocarbon and a conjugated diene hydrocarbon. An organic fine particle content of 0.02 parts by weight or more provides excellent effects to improve the lubricity and blocking resistance, and a content of 0.15 parts by weight or less does not lower the transparency of the film. A content within such a range is thus desirable.

When the above (ii) high impact polystyrene and (iii) organic fine particles are used in the layers (A), uniform, minute projections can be formed on the surface of the multilayer heat-shrinkable styrene-based film of the present invention.

When using the multilayer heat-shrinkable styrene-based film of the present invention as a label, because the desired surface roughness may differ between the printing surface and the other surface that will contact the container, the amounts of high impact polystyrene and organic fine particles to be contained in each layer (A) of the present invention may be changed between the front layer and the back layer as required insofar as the effects of the invention are not impaired.

According to one embodiment of the film of the present invention, in a layer (A), it is preferable to use, for example, a styrene-butadiene block copolymer (85 wt % styrene and 15 wt % butadiene) as a block copolymer of a vinyl aromatic hydrocarbon and a conjugated diene hydrocarbon; a styrene-butadiene graft polymer (Toyo Styrol E640: product of Toyo-Styrene Co., Ltd.) as high impact polystyrene; and particles of cross-linked methyl methacrylate-styrene copolymer as organic fine particles. The layers (A) form the front layer and the back layer of the film of the present invention. These two layers may have the same composition, and the composition of one layer may be different from that of the other layer.

(2) Layer (B)

In the multilayer heat-shrinkable styrene-based film of the present invention, a layer (B) is either of the below-described layer (B1) and layer (B2). The compositions of the layer (B1) and layer (B2) are explained hereinafter. As used herein, when referring to both layers (B1) and (B2), they may be collectively referred to as "layer (B)".

(2-1) Layer (B1)

Layer (B1) is formed of a block copolymer of a vinyl aromatic hydrocarbon and a conjugated diene hydrocarbon.

Examples of vinyl aromatic hydrocarbons usable for the layer (B1) of the present invention include styrene, o-methylstyrene, p-methylstyrene, 2,4-dimethylstyrene, 2,5-dimethylstyrene, α-methylstyrene, etc. Styrene is preferable.

Examples of usable conjugated diene hydrocarbons include 1,3-butadiene, 2-methyl-1,3-butadiene (isoprene), 2,3-dimethyl-1,3-butadiene, 1,3-pentadiene, 1,3-hexadiene, etc. 1,3-Butadiene and isoprene are preferable.

A block copolymer of a vinyl aromatic hydrocarbon and a conjugated diene hydrocarbon as described above may be used alone. Alternatively, a combination of two or more kinds of block copolymers of a vinyl aromatic hydrocarbon and a conjugated diene hydrocarbon having different compositions may also be used. More specifically, a combination of two or more kinds of block copolymers having different proportions of vinyl aromatic hydrocarbon and conjugated diene hydrocarbon may be used, and two or more kinds of block copolymers having different combinations of vinyl aromatic hydrocarbon and conjugated diene hydrocarbon may also be used.

Among block copolymers of such a vinyl aromatic hydrocarbon and such a conjugated diene hydrocarbon, a preferable combination is, for example, the combination of styrene and 1,3-butadiene.

The MFR of such a block copolymer (temperature: 200° C., load: 49.03 N) is about 2 to about 15 g/10 min, and preferably about 4 to about 9 g/10 min.

In the block copolymer used in the layer (B1), the content of vinyl aromatic hydrocarbon is about 70 to about 85 wt %, and preferably about 75 to about 80 wt %. The content of conjugated diene hydrocarbon is about 15 to about 30 wt %, and preferably about 20 to about 25 wt %.

A vinyl aromatic hydrocarbon content of 70 wt % or more improves the rigidity and natural shrinkage resistance of the film, and a content of 85 wt % or less prevents the lowering of the impact strength and thermal shrinkage. A content within such a range is thus desirable.

The layer (B1) contains, as a main component, a block copolymer of a vinyl aromatic hydrocarbon and a conjugated diene hydrocarbon as described above. If necessary, a styrene homopolymer, styrene-based elastomer (e.g., a styrene-butadiene block copolymer having a butadiene content of about 50 wt % or more, or hydrogenation product thereof etc.), and the like may be added thereto.

The content of a block copolymer of a vinyl aromatic hydrocarbon and a conjugated diene hydrocarbon in the layer (B1) is about 100 to about 55 wt %, and preferably about 100 to about 75 wt %.

(2-2) Layer (B2)

A layer (B2) is formed of a copolymer of a vinyl aromatic hydrocarbon and an aliphatic unsaturated carboxylic acid ester.

Examples of vinyl aromatic hydrocarbons usable in the core layer of the film of the present invention include styrene, o-methylstyrene, p-methylstyrene, 2,4-dimethylstyrene, 2,5-dimethylstyrene, α-methylstyrene, etc. Styrene is preferable.

Examples of usable aliphatic unsaturated carboxylic acid esters include methyl (meth)acrylate, butyl (meth)acrylate, 2-ethylhexyl (meth)acrylate, lauryl (meth)acrylate, stearyl (meth)acrylate, etc. The above "(meth)acrylate" indicates acrylate and/or methacrylate. As an aliphatic unsaturated carboxylic acid ester, butyl (meth)acrylate is preferable.

Among copolymers of such a vinyl aromatic hydrocarbon and such an aliphatic unsaturated carboxylic acid ester, a preferable combination is, for example, the combination of styrene and butyl acrylate.

A copolymer of a vinyl aromatic hydrocarbon and an aliphatic unsaturated carboxylic acid ester as described above may be used alone. Alternatively, a combination of two or more kinds of copolymers of a vinyl aromatic hydrocarbon and an aliphatic unsaturated carboxylic acid ester having different compositions may also be used. More specifically, a combination of two or more kinds of copolymers having different proportions of vinyl aromatic hydrocarbon and aliphatic unsaturated carboxylic acid ester may be used, and two or more kinds of copolymers having different combinations of vinyl aromatic hydrocarbon and aliphatic unsaturated carboxylic acid ester may also be used.

The content of vinyl aromatic hydrocarbon in the copolymer is about 98 to about 40 wt %, preferably about 95 to about 75 wt %, and more preferably about 85 to about 75 wt %. The content of aliphatic unsaturated carboxylic acid ester is about 2 to about 60 wt %, preferably about 5 to about 25 wt %, and more preferably about 15 to about 25 wt %.

When the vinyl aromatic hydrocarbon content is 40 wt % or more, the Vicat softening temperature is not lowered, providing natural shrinkage resistance to the film of the present invention. When the vinyl aromatic hydrocarbon content is 98 wt % or less, the Vicat softening temperature does not excessively increase, enabling a film having excellent shrinkability, especially low-temperature shrinkability.

The copolymer of a vinyl aromatic hydrocarbon and an aliphatic unsaturated carboxylic acid ester as described above provides rigidity and natural shrinkage resistance to the film. However, such a copolymer is hard and brittle, and the resulting breaking resistance may be poor. Therefore, for the purpose of providing sufficient breaking resistance to the film of the present invention, for example, a block copolymer of a vinyl aromatic hydrocarbon and a conjugated diene hydrocarbon or the like may be used therein. This makes it possible to obtain a film having high rigidity, natural shrinkage resistance, and breaking resistance.

In a block copolymer of a vinyl aromatic hydrocarbon and a conjugated diene hydrocarbon used to provide breaking resistance to the film of the present invention, examples of usable vinyl aromatic hydrocarbons include styrene, o-methylstyrene, p-methylstyrene, 2,4-dimethylstyrene, 2,5-dimethylstyrene, α-methylstyrene, etc. Styrene is preferable.

Examples of usable conjugated diene hydrocarbons include 1,3-butadiene, 2-methyl-1,3-butadiene (isoprene), 2,3-dimethyl-1,3-butadiene, 1,3-pentadiene, 1,3-hexadiene, etc. 1,3-Butadiene and isoprene are preferable.

Among block copolymers of such a vinyl aromatic hydrocarbon and such a conjugated diene hydrocarbon, a preferable combination is, for example, the combination of styrene and 1,3-butadiene.

A block copolymer of a vinyl aromatic hydrocarbon and a conjugated diene hydrocarbon as described above may be used alone. Alternatively, a combination of two or more kinds of block copolymers of a vinyl aromatic hydrocarbon and a conjugated diene hydrocarbon having different compositions may also be used. More specifically, a combination of two or more kinds of block copolymers having different proportions of vinyl aromatic hydrocarbon and conjugated diene hydrocarbon may be used, and two or more kinds of block copolymers having different combinations of vinyl aromatic hydrocarbon and conjugated diene hydrocarbon may also be used.

When using a block copolymer of a vinyl aromatic hydrocarbon and a conjugated diene hydrocarbon in the layer (B2), the copolymerization ratio of such a block copolymer is as follows. The content of vinyl aromatic hydrocarbon is about 30 to about 80 wt %, and preferably about 35 to about 75 wt %, and the content of conjugated diene hydrocarbon is about 20 to about 70 wt %, and preferably about 25 to about 65 wt %. A vinyl aromatic hydrocarbon content of 30 wt % or more can provide sufficient natural shrinkage resistance to a film, and a content of 80 wt % or less further provides excellent shock resistance.

In the film of the present invention, the proportion of the copolymer of a vinyl aromatic hydrocarbon and an aliphatic unsaturated carboxylic acid ester is about 30 to about 90 wt %, and preferably about 45 to about 85 wt %, based on the entire core layer. A copolymer proportion of 30 wt % or more makes it possible to provide excellent rigidity and natural shrinkage resistance to a laminate film, and a proportion of 90 wt % or less further imparts excellent breaking resistance. When using a block copolymer of a vinyl aromatic hydrocarbon and a conjugated diene hydrocarbon in a core layer, the proportion thereof may be suitably determined based on the proportion of the copolymer of a vinyl aromatic hydrocarbon and an aliphatic unsaturated carboxylic acid ester. The proportion of the block copolymer is usually about 10 to about 70 wt %, and preferably about 15 to about 55 wt %, based on the entire core layer.

In the layer (B2) of the film of the present invention, it is preferable to use, for example, a styrene-butyl acrylate copolymer as a copolymer of a vinyl aromatic hydrocarbon and an aliphatic unsaturated carboxylic acid ester; and a styrene-butadiene block copolymer as a block copolymer of a vinyl aromatic hydrocarbon and a conjugated diene hydrocarbon.

A typical example of the multilayer heat-shrinkable styrene-based film of the present invention includes layers (A) and a layer (B), and has a structure of layer (A)/layer (B)/layer (A). The layer (B) may be either a layer (B1) or layer (B2). According to another embodiment of the present invention, the film may have, in addition to the layers (A) and (B), an intermediate layer (C) between a layer (A) and the layer (B). In this case, a four-layer structure of layer (A)/layer (C)/layer (B)/layer (A) is possible. A structure in which a plurality of layers (C) are symmetrically positioned, e.g., a five-layer structure of layer (A)/layer (C)/layer (B)/layer (C)/layer (A), is less susceptible to curling and like problems and thus is especially preferable. The layer (B) may be either a layer (B1) or a layer (B2).

For such an intermediate layer (C), a styrene homopolymer (GPPS), a styrene-conjugated diene block copolymer hydrogenation product (SEBS, SIBS, etc.), a mixture of the resins that form the layers (A) and the layer (B1), a mixture of the resins that form the layers (A) and the layer (B2), etc., can be used. The intermediate layer (C) may be provided to adjust the stiffness (rigidity) of the film, or as a layer for recycling scraps generated upon production, etc.

The total thickness of the multilayer heat-shrinkable styrene-based film of the present invention is about 30 to about 70 μm, preferably about 35 to about 65 μm, and more preferably about 40 to about 60 μm.

The thickness of the layers (A) and the core layers (B1) or (B2) is as follows. Each layer (A) has a thickness of about 2.5 to about 17.5 μm, and preferably about 2.9 to about 16.3 μm. The layer (B) (i.e., layer (B1) or layer (B2)) has a thickness of about 20 to about 58.3 μm, and preferably about 17.5 to about 54.2 μm.

The proportion of each layer (A) in the entire film is, provided that the entire film is 1, 0.09 to 0.25, preferably 0.09 to 0.16, and more preferably 0.09 to 0.14.

The proportion of the layer (B) in the entire film is, provided that the entire film is 1, 0.50 to 0.82, preferably 0.68 to 0.82, and more preferably 0.72 to 0.82.

The ratio between each layer (A) and the layer (B) is such that, provided that the layer (A) is 1, the layer (B) is 2 to 9, preferably 4 to 9, and more preferably 5 to 9.

In order to prevent the film from curling, etc., the layers (A) preferably have the same thickness for the front and back layers.

When the film has an intermediate layer (C), the thickness of the layer (C) can be suitably determined based on the thickness of the layers (A) and layer (B), and is usually about 1.5 to about 5.0 μm, and preferably about 2.0 to about 3.5 μm.

The multilayer heat-shrinkable styrene-based film of the present invention has shrink properties as follows. When immersed in 70° C. warm water for 10 seconds, the shrinkage in the main shrinkage direction is about 10 to about 30%, and when immersed in boiling water for 10 seconds, the shrinkage in the main shrinkage direction is about 65 to about 80%. The desired shrink properties differ depending on the shape of the container, the extent to which the label covers the container, and the wear conditions (speed, the use of a wet-heat or a dry-heat tunnel, etc.). Therefore, the shrinkage should preferably cover a certain range.

The shrinkage can be measured by the following method. A sample of 100×100 mm is cut out, immersed in warm water of a predetermined temperature for 10 seconds, and removed. The length of the sample is then measured. The direction in which the shrinkage is greatest (the direction in which the resulting length is shortest) is defined as the main shrink direction. Defining the length in this direction as L mm, (100−L) is calculated as shrinkage.

Further, the multilayer heat-shrinkable styrene-based film of the present invention has a haze value measured in accordance with the method described in Test Example 1 below of about 2 to about 5%, and preferably about 3 to about 4.8%; a surface roughness (ten point height of roughness profile: Rz) measured in accordance with JISB0610-2001 of about 0.7 to about 2 μm, and preferably about 0.9 to about 1.9 μm; a blocking strength measured in accordance with the method described in Test Example 3 of about 1 to about 2 N, and preferably about 1 to about 1.5 N; and a dynamic coefficients of friction measured in accordance with the method described in Test Example 4 of 0.2 to 0.4, and preferably 0.25 to 0.35. In addition to having these properties, the multilayer heat-shrinkable styrene-based film of the present invention solves the problem of ink skipping.

The present inventors believe as follows, although this is not intended to limit the interpretation of the present invention. Organic fine particles are likely to protrude from the film surface due to the difference in surface energy (compatibility) between the organic fine particles and the resin, while high impact polystyrene forms relatively smooth projections. The adjustment of the blending ratio between such organic fine particles and high impact polystyrene makes it possible to obtain a multilayer heat-shrinkable styrene-based film which satisfies the effects required for the present invention.

Method for Producing a Multilayer Heat-shrinkable Styrene-based Film

The multilayer heat-shrinkable styrene-based film of the present invention can be produced in accordance with conventionally known film production methods.

The method for producing a film of the present invention may be, for example, as follows: a method for producing a multilayer heat-shrinkable styrene-based film, the method comprising the steps of extruding and stretching a resin composition (a) for forming layers (A) and a resin composition (b1) or (b2) for forming a layer (B), so that the resin composition (a) forms front and back layers, and the resin composition (b1) or (b2) forms a core layer.

The components of the resin composition (a), the resin composition (b1), and the resin composition (b2) are as described in the above (1) Layer (A), (2-1) Layer (B1), and (2-2) Layer (B2), respectively.

A specific example of the production method is as follows.

When producing a multilayer heat-shrinkable styrene-based film having a three-layer structure of layer (A)/layer (B1) or layer (B2)/layer (A), a resin for forming each layer is placed in a single screw extruder with a barrel temperature of 160 to 210° C., extruded from a multi-manifold die with a temperature of 185 to 210° C. into a plate-like shape, and then cooled and solidified using a chill roll adjusted to 20 to 50° C. Subsequently, in a roll drawing machine adjusted to 80 to 85° C., the plate-like shaped resin is longitudinally stretched to 1 to 1.5 times its original length by the velocity difference of a low-speed roller to a high-speed roller. Then, in a tenter drawing machine, thus obtained stretched resin is preheated at a preheating zone (100 to 110° C.), and transversely stretched to 5 to 6 times its original length in a stretching zone (80 to 90° C.). The resin (formed to a shape of a film) is heat set in a fixing zone (60 to 70° C.), and then wound by a winding machine to obtain a roll film.

Uses

In recent years, design-related demands for the labels of drink bottles, etc., are increasing, and printing has been commonly performed using more colors than in conventional practice. A smooth film surface is particularly desirable when performing multicolor printing. On the other hand, in order to impart blocking resistance, a surface having fine projections and depressions (a sea-island structure) is desirable. The surface of the multilayer heat-shrinkable styrene-based film of the present invention has a uniform sea-island structure, and has excellent blocking resistance and lubricity. Therefore, ink skipping during the printing process is less likely to occur, and it is possible to obtain a clear printing image even when performing multi-color printing by gravure methods, etc.

The multilayer heat-shrinkable styrene-based film of the present invention also has excellent transparency, rigidity, dimensional stability, impact strength, etc. In addition, because styrene-based resin is inexpensive, production costs can be reduced. Further, styrene-based resin can be easily cut along perforations that are given to the label for the purpose of recovering the label, and the film is thus user-friendly and desirable to consumers.

When the core layer is a layer (B2), and a block copolymer of a vinyl aromatic hydrocarbon and a conjugated diene hydrocarbon is used therein, this provides excellent shock resistance to the film of the present invention.

For printing on the multilayer heat-shrinkable styrene-based film of the present invention, for example, gravure printing, flexographic printing, offset printing, and like conventionally known printing methods can be applied. The film of the present invention is not easily subject to ink skipping and has excellent transparency, and thus can be suitably applied to multicolor printing. Accordingly, it is possible to perform printing on the film of the present invention, and use it as a label, etc.

The multilayer heat-shrinkable styrene-based film of the present invention in printed form can also be used as a label for a container. Examples of such containers include PET bottles, glass bottles, etc. The multilayer heat-shrinkable styrene-based film of the present invention can be closely overlapped to such a container by heat shrinking using conventional methods to serve as a label for the container.

For example, when the multilayer heat-shrinkable styrene-based film of the present invention is used as a label of a PET bottle, first, both ends of the film of the present invention in a flat shape are joined by center sealing to form a tube-like shape (tubular shape). Then, a PET bottle is covered by the tubular-shaped film of the present invention and heated in a wet-heat tunnel using steam at about 70 to about 130° C. for about 2 to about 15 seconds. In the case of a dry-heat tunnel using a hot blast, the film is heated at about 100 to about 250° C. for about 5 to about 30 seconds. The film is thereby heat-shrunk and closely over lapped the PET bottle. A PET bottle labeled with the film of the present invention can thus be obtained.

In addition to the above use, the multilayer heat-shrinkable styrene-based film of the present invention can be suitably used for, for example, cap sealing, belt labeling, bundled packaging, stacked packaging, etc.

EXAMPLES

Examples and Test Examples will be shown below to describe the present invention in detail, but the present invention is not limited to these examples.

Example 1

To 100 parts by weight of a styrene-butadiene block copolymer (85% by weight of styrene, 15% by weight of 1,3-butadiene, MFR: 6 g/10 min. (temperature: 200° C., load: 49.03 N), Vicat softening point: 84° C.), a resin composition prepared by blending 1.2 parts by weight of a high impact polystyrene resin (Toyo Styrol E640 manufactured by Toyo Styrene Co., Ltd., MFR: 2.7 g/10 min. (temperature: 200° C., load: 49.03 N), Vicat softening point: 92° C.) and 0.06 parts by weight of an organic fine particle (crosslinked methyl methacrylate-styrene copolymer particle: particle diameter 3.3 μm) was fed to two single screw extruders (one each for the front layer and the back layer) having a barrel temperature of 160 to 190° C. as a raw material of (A) layer.

A styrene-butadiene block copolymer (80% by weight of styrene, 20% by weight of 1,3-butadiene, MFR: 7 g/10 min. (temperature: 200° C., load: 49.03 N), Vicat softening point: 74° C.) was fed into a single screw extruder having a barrel temperature of 160 to 190° C. as a raw material of (B1) layer. A sheet extruded in the form of a plate from a multilayer die having a temperature of 190° C. was drawn by a chill roll having a temperature of 25° C., cooled and cured. The sheet was then longitudinally stretched about 1.3 times its original length in a longitudinal stretching machine having a heating roller which was adjusted to 85° C., and was transversely stretched about 5.5 times its original length in a tenter stretching machine having an afterheat zone at 110° C. and a stretching zone at 90° C. The sheet was annealed at 70° C. and then wound up by a winder, giving a multilayer heat-shrinkable styrene-based film in the form of a roll.

The total thickness of the obtained multilayer film was 50 μm, and the thickness of the individual layers were 6 μm, 38 μm, and 6 μm, respectively.

According to the compositional ratios shown in Table 1 below, multilayer heat-shrinkable styrene-based films of Examples 2 to 4 and Comparative Examples 1 to 3 were produced in a manner similar to Example 1. The high impact polystyrene and organic fine particle used are the same as those used in Example 1. The organic fine particle used in Example 2 is the same material as that used in Example 1 except for its particle size. Moreover, the total thickness of the multilayer films of Examples 2 to 4 and Comparative Examples 1 to 3 and the thickness of each layer were also the same as in Example 1.

Example 5

A multilayer heat-shrinkable styrene-based film was obtained in a manner similar to Example 1 except for providing a structure of (A) layer/(C) layer/(B1) layer/(C) layer/(A) layer by using a resin composition prepared by blending 25% by weight of a resin composition constituting the (A) layer of Example 1 and 75% by weight of a resin constituting the (B1) layer as the intermediate layer (C).

The total thickness of the of obtained multilayer film was 50 μm, and the thickness of the individual layers were 6 μm, 3 μm, 32 μm, 3 μm, and 6 μm, respectively.

TABLE 1

| | Front and Back layers (A) | | Core layer (B) | Intermediate layer (C) |
|---|---|---|---|---|
| Ex. 1 | Styrene-butadiene block copolymer | | Styrene-butadiene block copolymer | |
| | Styrene/1,3-butadiene = 85 wt %/15 wt % | 100 parts by weight | Styrene/1,3-butadiene = 80 wt %/20 wt % | |
| | High impact polystyrene | 1.2 parts by weight | | |
| | Organic fine particles (3.3 μm) | 0.06 parts by weight | | |

TABLE 1-continued

| | Front and Back layers (A) | | Core layer (B) | Intermediate layer (C) | |
|---|---|---|---|---|---|
| Ex. 2 | Styrene-butadiene block copolymer | | Styrene-butadiene block copolymer | | |
| | Styrene/1,3-butadiene = 85 wt %/15 wt % | 100 parts by weight | Styrene/1,3-butadiene = 80 wt %/20 wt % | | |
| | High impact polystyrene | 1.2 parts by weight | | | |
| | Organic fine particles (2.5 μm) | 0.03 parts by weight | | | |
| | Organic fine particles (4.0 μm) | 0.03 parts by weight | | | |
| Ex. 3 | Styrene-butadiene block copolymer | | Styrene-butadiene block copolymer | | |
| | Styrene/1,3-butadiene = 85 wt %/15 wt % | 100 parts by weight | Styrene/1,3-butadiene = 80 wt %/20 wt % | | |
| | High impact polystyrene | 1.4 parts by weight | | | |
| | Organic fine particles (3.3 μm) | 0.06 parts by weight | | | |
| Ex. 4 | Styrene-butadiene block copolymer | | Styrene-butadiene block copolymer | | |
| | Styrene/1,3-butadiene = 85 wt %/15 wt % | 100 parts by weight | Styrene/1,3-butadiene = 80 wt %/20 wt % | | |
| | High impact polystyrene | 1.4 parts by weight | | | |
| | Organic fine particles (3.3 μm) | 0.1 parts by weight | | | |
| Ex. 5 | Styrene-butadiene block copolymer | | Styrene-butadiene block copolymer | Resin composition that forms front and back layers (A) | 25 wt % |
| | Styrene/1,3-butadiene = 85 wt %/15 wt % | 100 parts by weight | Styrene/1,3-butadiene = 80 wt %/20 wt % | | |
| | High impact polystyrene | 1.2 parts by weight | | Composition that forms core layer (B1) | 75 wt % |
| | Organic fine particles (3.3 μm) | 0.06 parts by weight | | | |
| Comp. Ex. 1 | Styrene-butadiene block copolymer | | Styrene-butadiene block copolymer | | |
| | Styrene/1,3-butadiene = 85 wt %/15 wt % | 100 parts by weight | Styrene/1,3-butadiene = 80 wt %/20 wt % | | |
| | High impact polystyrene | 1.4 parts by weight | | | |
| Comp. Ex. 2 | Styrene-butadiene block copolymer | | Styrene-butadiene block copolymer | | |
| | Styrene/1,3-butadiene = 85 wt %/15 wt % | 100 parts by weight | Styrene/1,3-butadiene = 80 wt %/20 wt % | | |
| | Organic fine particles (3.3 μm) | 0.1 parts by weight | | | |
| Comp. Ex. 3 | Styrene-butadiene block copolymer | | Styrene-butadiene block copolymer | | |
| | Styrene/1,3-butadiene = 85 wt %/15 wt % | 100 parts by weight | Styrene/1,3-butadiene = 80 wt %/20 wt % | | |
| | High impact polystyrene | 1.4 parts by weight | | | |
| | Organic fine particles (6.6 μm) | 0.1 parts by weight | | | |

Test Example 1. Measurement of Haze

Samples for measurement having a dimension of 50 mm (length)×50 mm (width) (samples were cut out with the direction of the film flow being the lengthwise direction, and its transverse direction being the widthwise direction) were cut out from given positions of the films of Examples 1 to 5 and Comparative Examples 1 to 3.

The obtained samples for measurement were loaded into NDH2000 manufactured by Nippon Denshoku Industries Co., Ltd., and their haze values were measured according to ASTM D-1003. A haze value of 5% or lower was considered excellent. When the haze value is higher than 5%, the film becomes white and cloudy. Since printing is applied on the back side, cloudiness in the film disadvantageously deteriorates the color development property of a printed image.

Test Example 2. Measurement of Surface Roughness

Samples for measurement having a dimension of 20 mm (length)×50 mm (width) (samples were cut out with the direction of the film flow being the lengthwise direction, and its transverse direction being the widthwise direction) were cut out from given positions of the films of Examples 1 to 5 and Comparative Examples 1 to 3.

The obtained samples for measurement were loaded into Surfcom 570A manufactured by Tokyo Seimitsu Co., Ltd., and their ten point height of roughness profile Rz were measured according to JIS B0610-2001.
The measurement conditions were as follows:
Cutoff: 0.8 mm
Drive speed of measurement terminal: 0.3 mm/sec.
Measurement length: 8 mm
Measurement magnification: 5000 times Samples whose values Rz obtained by the above-mentioned measurement method were 2.0 or lower were considered to have excellent surface roughness. This is because if the value Rz is higher than 2.0, irregularity becomes too great for the depth of the gravure plate in gravure printing, and thus ink skipping is likely to occur.

Test Example 3. Evaluation of Anti-blocking Property

Two samples for measurement having a dimension of 100 mm (Length)×30 mm (width) (samples were cut out with the direction of the film flow being the lengthwise direction and its transverse direction being the widthwise direction) were cut out from given positions of the obtained films.

The two samples for measurement were placed in such a manner that their identical faces (faces which come into contact with a chill roll) overlapped in the area sized 40 mm (length)×30 mm (width). These overlapping samples for measurement were placed between two glass plates, and a 600-g weight was placed on the portion where the samples were overlapping from above.

This test piece was placed in a constant temperature oven at 40° C., and was left to stand for 7 days. 7 days after, the sample removed from the constant temperature oven was loaded into a peeling tester (Peeling TESTER HEIDON-17) manufactured by Shinto Scientific Co., Ltd., and the strength of blocking was measured at a rate of pulling of 200 mm/min. Samples whose blocking strength values obtained by said measurement method were 2.0 N/cm or lower were considered to have excellent anti-blocking property.

When a film is in the form of a roll, the film is sometimes in a state of being pressed against each other with pressure, which may cause blocking. Such blocked portions may fail to peel off when the film is unwound from the roll, and thus the film may be broken. Therefore, the lower the numerical value of blocking strength, the better.

Test Example 4. Evaluation of Lubricity: Measurement of Dynamic Coefficients of Friction Samples for measurement were cut out from given positions of the obtained films and their dynamic coefficients of friction between the films (the faces which come into contact with the chill roll) were measured by using a surface property tester (Surface Property Tester 14DR) manufactured by Shinto Scientific Co., Ltd. according to ASTM D 1894.

The samples whose values of the dynamic coefficients of friction obtained by the above measurement method were 0.4 or lower were considered to have excellent surface roughness.

If the dynamic coefficients of friction is higher than 0.4, the runnability of the film is lowered. This likely causes out-of-register printing (the inks do not line up properly since the film does not run in a straight line), increased affixing failures in the process of affixing labels (labels are prevented from being affixed to predetermined positions since the resistance between the labels and the surfaces of bottles is high), and other problems in printing processes.

Test Example 5. Evaluation of Spattering of Printing Ink

Printing evaluation of the obtained films was carried out by using a five-color gravure printing machine under the conditions described below to evaluate ink skipping.
Width of film: 900 mm
Printing inks: OSM-type sepia, red, yellow, blue, white (base portion) manufactured by Dainichiseika Color & Chemicals Mfg. Co., Ltd., ink viscosity: 15 sec. (Zahn cup method, Zahn cup #3)
Plate: color chart plates prepared by engraving platemaking
Printing speed: 150 m/min.
Evaluation: In the portion of 5 to 20% in a gradation curve of 0 to 100%, the films which were found to have printed images with clear outlines or with no missing color (missing ink) by visual inspection, by observation using a magnifying glass or by a printing defect detector were considered excellent, otherwise the films were considered poor.

Figure 2:
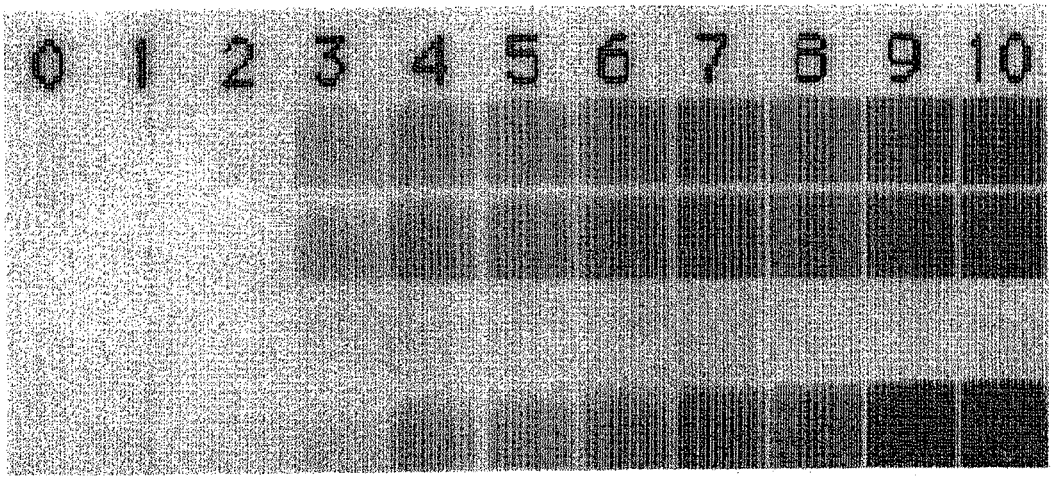
FIG. 2 is a photograph showing the results of an evaluation of ink skipping in Comparative Example 3.

The photographs which were used for evaluating ink skipping in Example 1 and Comparative Example 3 are shown as FIG. 1 and FIG. 2, respectively. In the photographs, 0 represents 0%, 1 represents 5%, 2 represents 10%, 3 represents 15%, and 4 represents 20% in the gradation curve.

The results of Test Examples 1 to 5 described above are shown in Table 2.

TABLE 2

| | Haze (%) | Surface Roughness Rz (μm) | Blocking Strength (N) | Dynamic coefficients of friction | Ink Skipping |
|---|---|---|---|---|---|
| Ex. 1 | 4.3 | 1.75 | 1.2 | 0.31 | Excellent |
| Ex. 2 | 4.2 | 1.75 | 1.3 | 0.30 | Excellent |
| Ex. 3 | 4.5 | 1.81 | 1.1 | 0.28 | Excellent |
| Ex. 4 | 4.7 | 1.82 | 1.0 | 0.28 | Excellent |
| Ex. 5 | 4.3 | 1.75 | 1.1 | 0.31 | Excellent |
| Comp. Ex. 1 | 3.9 | 1.45 | 3.6 | 0.49 | Excellent |
| Comp. Ex. 2 | 2.5 | 1.37 | 3.8 | 0.45 | Excellent |
| Comp. Ex. 3 | 5.5 | 1.98 | 1.3 | 0.33 | Poor |

As can be clearly seen from the results, the multilayer heat-shrinkable styrene-based film of the present invention has excellent properties in all measured criteria: haze, surface roughness, blocking, lubricity and ink skipping.

Example 6

Front layers and back layers were formed in a manner similar to Example 1. Furthermore, a core layer was formed in a manner similar to Example 1 except that 50% by weight of a styrene-butyl acrylate copolymer (80% by weight of styrene, 20% by weight of butyl acrylate, MFR: 6 g/10 min. (temperature: 200° C., load: 49.03 N), Vicat softening point: 65° C.) and a styrene-butadiene block copolymer (70% by weight of styrene, 30% by weight of 1,3-butadiene, MFR: 7 g/10 min. (temperature: 200° C., load: 49.03 N)) were used as raw materials of the core layer, giving a multilayer heat-shrinkable styrene-based film in the form of a roll.

The total thickness of the obtained multilayer film was 50 μm, and the thickness of the individual layers were 7 μm, 36 μm, and 7 μm.

The multilayer heat-shrinkable styrene-based films of Examples 7 to 9 and Comparative Examples 4 to 6 were produced in a manner similar to Example 6 according to the compositional ratio shown in Table 3 below. The high impact polystyrene and organic fine particle used are the same as those used in Example 6. The organic fine particle used in Example 7 is the same material as that used in Example 6 with a different particle size. Moreover, the total thickness of the multilayer films and the thickness of the individual layers of Examples 7 to 9 and Comparative Examples 4 to 6 are also the same as in Example 6.

Example 10

A multilayer heat-shrinkable styrene-based film was obtained in a manner similar to Example 1 except for providing a structure of (A) layer/(C) layer/(B2) layer/(C) layer/(A) layer by using a resin composition prepared by blending 25% by weight of a resin composition constituting (A) layer of Example 6 and 75% by weight of a resin constituting the (B2) layer as intermediate layer (C).

The total thickness of the obtained multilayer film was 50 μm, and the thickness of the individual layer were 6 μm, 3 μm, 32 μm, 3 μm, and 6 μm.

TABLE 3

| | Front and Back layers (A) | | Core layer (B) | | Intermediate layer (C) | |
|---|---|---|---|---|---|---|
| Ex. 6 | Styrene-butadiene block copolymer Styrene/1,3-butadiene = 85 wt %/15 wt % | 100 parts by weight | Styrene-butyl acrylate copolymer Styrene/butyl acrylate = 80 wt %/20 wt % | 50 wt % | | |
| | High impact polystyrene | 1.2 parts by weight | Styrene-butadiene block copolymer | | | |
| | Organic fine particles (3.3 μm) | 0.06 parts by weight | Styrene/butadiene = 70 wt %/30 wt % | 50 wt % | | |
| Ex. 7 | Styrene-butadiene block copolymer Styrene/1,3-butadiene = 85 wt %/15 wt % | 100 parts by weight | Styrene-butyl acrylate copolymer Styrene/butyl acrylate = 80 wt %/20 wt % | 50 wt % | | |
| | High impact polystyrene | 1.2 parts by weight | Styrene-butadiene block copolymer | | | |
| | Organic fine particles (2.5 μm) | 0.03 parts by weight | Styrene/butadiene = 70 wt %/30 wt % | 50 wt % | | |
| | Organic fine particles (4.0 μm) | 0.03 parts by weight | | | | |
| Ex. 8 | Styrene-butadiene block copolymer Styrene/1,3-butadiene = 85 wt %/15 wt % | 100 parts by weight | Styrene-butyl acrylate copolymer Styrene/butyl acrylate = 80 wt %/20 wt % | 50 wt % | | |
| | High impact polystyrene | 1.4 parts by weight | Styrene-butadiene block copolymer | | | |
| | Organic fine particles (3.3 μm) | 0.06 parts by weight | Styrene/butadiene = 70 wt %/30 wt % | 50 wt % | | |
| Ex. 9 | Styrene-butadiene block copolymer Styrene/1,3-butadiene = 85 wt %/15 wt % | 100 parts by weight | Styrene-butyl acrylate copolymer Styrene/butyl acrylate = 80 wt %/20 wt % | 50 wt % | | |
| | High impact polystyrene | 1.4 parts by weight | Styrene-butadiene block copolymer | | | |
| | Organic fine particles (3.3 μm) | 0.1 parts by weight | Styrene/butadiene = 70 wt %/30 wt % | 50 wt % | | |
| Ex. 10 | Styrene-butadiene block copolymer Styrene/1,3-butadiene = 85 wt %/15 wt % | 100 parts by weight | Styrene-butyl acrylate copolymer Styrene/butyl acrylate = 80 wt %/20 wt % | 50 wt % | Resin composition that forms front and back layers (A) | 25 wt % |
| | High impact polystyrene | 1.2 parts by weight | Styrene-butadiene block copolymer | | Composition that forms core layer (B2) | 75 wt % |
| | Organic fine particles (3.3 μm) | 0.06 parts by weight | Styrene/butadiene = 70 wt %/30 wt % | 50 wt % | | |
| Comp. Ex. 4 | Styrene-butadiene block copolymer Styrene/1,3-butadiene = 85 wt %/15 wt % | 100 parts by weight | Styrene-butyl acrylate copolymer Styrene/butyl acrylate = 80 wt %/20 wt % | 50 wt % | | |
| | High impact polystyrene | 1.4 parts by weight | Styrene-butadiene block copolymer Styrene/butadiene = 70 wt %/30 wt % | 50 wt % | | |
| Comp. Ex. 5 | Styrene-butadiene block copolymer Styrene/1,3-butadiene = 85 wt %/15 wt % | 100 parts by weight | Styrene-butyl acrylate copolymer Styrene/butyl acrylate = 80 wt %/20 wt % | 50 wt % | | |
| | Organic fine particles (3.3 μm) | 0.1 parts by weight | Styrene-butadiene block copolymer Styrene/butadiene = 70 wt %/30 wt % | 50 wt % | | |
| Comp. Ex. 6 | Styrene-butadiene block copolymer Styrene/1,3-butadiene = 85 wt %/15 wt % | 100 parts by weight | Styrene-butyl acrylate copolymer Styrene/butyl acrylate = 80 wt %/20 wt % | 50 wt % | | |
| | High impact polystyrene | 1.4 parts by weight | Styrene-butadiene block copolymer | | | |
| | Organic fine particles (6.6 μm) | 0.1 parts by weight | Styrene/butadiene = 70 wt %/30 wt % | 50 wt % | | |

Figure 3:
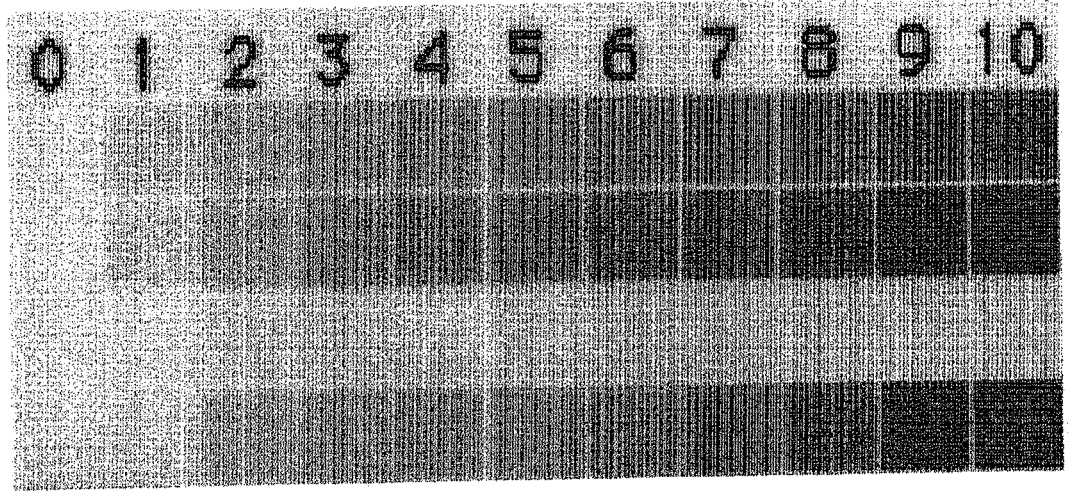
FIG. 3 is a photograph showing the results of an evaluation of ink skipping in Example 6.
Figure 4:
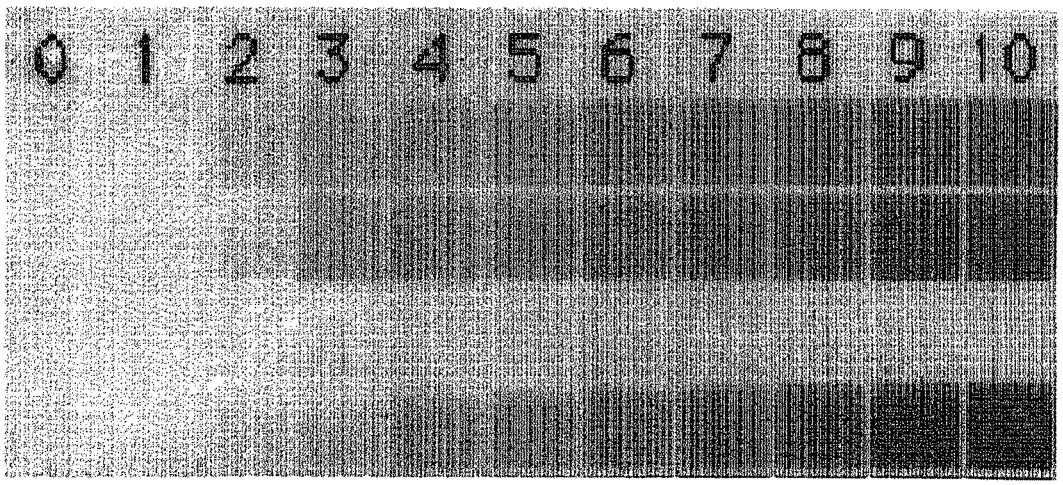
FIG. 4 is a photograph showing the results of an evaluation of ink skipping in Comparative Example 6.

The films of Examples 6 to 10 and Comparative Examples 4 to 6 were evaluated for their haze, surface roughness, blocking strength, dynamic coefficients of friction and ink skipping according to the methods of Test Examples 1 to 5. The results are shown in Table 4. Furthermore, the photographs used for evaluating ink skipping in Example 6 and Comparative Example 6 are shown as FIG. 3 and FIG. 4, respectively. In the photographs, 0 represents 0%, 1 represents 5%, 2 represents 10%, 3 represents 15%, and 4 represents 20% in the gradation curve.

TABLE 4

| | Haze (%) | Surface Roughness Rz (μm) | Blocking Strength (N) | Dynamic coefficients of friction | Ink Skipping |
|---|---|---|---|---|---|
| Ex. 6 | 4.0 | 1.60 | 1.2 | 0.31 | Excellent |
| Ex. 7 | 4.1 | 1.59 | 1.3 | 0.31 | Excellent |
| Ex. 8 | 4.3 | 1.63 | 1.1 | 0.28 | Excellent |
| Ex. 9 | 4.5 | 1.65 | 1.0 | 0.28 | Excellent |
| Ex. 10 | 4.3 | 1.75 | 1.1 | 0.31 | Excellent |
| Comp. Ex. 4 | 3.9 | 1.45 | 3.6 | 0.49 | Excellent |
| Comp. Ex. 5 | 2.5 | 1.37 | 3.8 | 0.45 | Excellent |
| Comp. Ex. 6 | 5.5 | 1.98 | 1.3 | 0.33 | Poor |

As can be clearly seen from the results, the multilayer heat-shrinkable styrene-based film of the present invention has excellent properties in all measured criteria: haze, surface roughness, blocking, lubricity and ink skipping.

INDUSTRIAL APPLICABILITY

The surface of the multilayer heat-shrinkable styrene-based film of the present invention has a uniform sea-island structure, and has excellent blocking resistance and lubricity. Therefore, ink skipping during the printing process is less likely to occur, and it is possible to obtain a clear printing image even when performing multicolor printing by gravure methods, etc.

The multilayer heat-shrinkable styrene-based film of the present invention also has excellent transparency, rigidity, dimensional stability, impact strength, etc. In addition, because styrene-based resin is inexpensive, production costs can be reduced. Styrene-based resin can be easily cut along perforations that are given to the label for the purpose of recovering the label, and the film is thus user-friendly and desirable to consumers. Further, when a block copolymer of a vinyl aromatic hydrocarbon and a conjugated diene hydrocarbon is used in the core layer, this provides excellent shock resistance to the film of the present invention.

The film of the present invention is not easily subject to ink skipping and has excellent transparency, and thus can be suitably applied to multicolor printing. Accordingly, it is possible to perform printing on the film of the present invention, and use it as a label, etc.

The multilayer heat-shrinkable styrene-based film of the present invention in printed form can be closely over lapped to a container by heat shrinking using conventional methods to serve as a label for the container. In addition to the above use, the multilayer heat-shrinkable styrene-based film of the present invention can be suitably used for, for example, cap sealing, belt labeling, bundled packaging, stacked packaging, etc.

The invention claimed is:

1. A multilayer heat-shrinkable styrene-based film comprising a layer (B1) between two layers (A),
    each of the layers (A) comprising 1 to 1.8 parts by weight of high impact polystyrene resin and 0.04 to 0.12 parts by weight of organic fine particles having a mean particle diameter of 0.5 to 5 μm per 100 parts by weight of a block copolymer of 80 to 90 wt % vinyl aromatic hydrocarbon and 10 to 20 wt % conjugated diene hydrocarbon,
    the layer (B1) comprising 55 to 100 wt % of a block copolymer of 70 to 85 wt % vinyl aromatic hydrocarbon and 15 to 30 wt % conjugated diene hydrocarbon.

2. A multilayer heat-shrinkable styrene-based film according to claim 1, wherein, in each of the layers (A), the block copolymer of a vinyl aromatic hydrocarbon and a conjugated diene hydrocarbon is a styrene-butadiene block copolymer (85 wt % styrene and 15 wt % butadiene); the high impact polystyrene is a styrene-butadiene graft polymer; and the organic fine particles are particles of cross-linked methyl methacrylate-styrene copolymer.

3. A multilayer heat-shrinkable styrene-based film according to claim 1, wherein, in the layer (B1), the block copolymer of a vinyl aromatic hydrocarbon and a conjugated diene hydrocarbon is a block copolymer of styrene and 1,3-butadiene.

4. A multilayer heat-shrinkable styrene-based film according to claim 1, wherein a rubber phase of the high impact polystyrene has a particle diameter of 1 to 3 μm.

5. A multilayer heat-shrinkable styrene-based film according to claim 1, wherein the total thickness of the multilayer heat-shrinkable styrene-based film is 30 to 70 μm, the thickness of each of the layers (A) is 2.5 to 17.5 μm, and the thickness of the layer (B1) is 25 to 58.3 μm.

6. A multilayer heat-shrinkable styrene-based film according to claim 1, having a three-layer structure of layer (A)/layer (B1)/layer (A).

7. A multilayer heat-shrinkable styrene-based film according to claim 6, further comprising a layer (C) as an intermediate layer between the layer (B1) and one or each of the layers (A);
    the layer (C) being at least one element selected from the group consisting of styrene homopolymers, styrene-conjugated diene block copolymer hydrogenation products, a mixture of resins that form the layers (A) and the layer (B1).

8. A multilayer heat-shrinkable styrene-based film according to claim 7, having a five-layer structure of layer (A)/layer (C)/layer (B1)/layer (C)/layer (A).

9. A method for producing a multilayer heat-shrinkable styrene-based film, the method comprising the steps of extruding and stretching:
    a resin composition (a) comprising 1 to 1.8 parts by weight of high impact polystyrene resin and 0.04 to 0.12 parts by weight of organic fine particles having a mean particle diameter of 0.5 to 5 μm per 100 parts by weight of a block copolymer of 80 to 90 wt % vinyl aromatic hydrocarbon and 10 to 20 wt % conjugated diene hydrocarbon; and
    a resin composition (b1) comprising 55 to 100 wt % of a block copolymer of 70 to 85 wt % vinyl aromatic hydrocarbon and 15 to 30 wt % conjugated diene hydrocarbon, so that the resin composition (a) forms a front layer and a back layer, and the resin composition (b1) forms a core layer.

* * * * *